US012764031B2

(12) United States Patent
Niu et al.

(10) Patent No.: US 12,764,031 B2
(45) Date of Patent: Oct. 13, 2026

(54) SYSTEMS AND METHODS FOR NETWORK ELEMENT CLUSTERING FOR RAN MONITORING

(71) Applicant: NetScout Systems, Inc., Westford, MA (US)

(72) Inventors: Xiaolong Niu, Shanghai (CN); Xiaojun Zeng, Shanghai (CN); Huelpuesch Steffen, Berlin (DE)

(73) Assignee: NetScout Systems, Inc., Westford, MA (US)

( * ) Notice: Subject to any disclaimer, the term of this patent is extended or adjusted under 35 U.S.C. 154(b) by 31 days.

(21) Appl. No.: 19/037,878

(22) Filed: Jan. 27, 2025

(65) Prior Publication Data

US 2026/0142884 A1 May 21, 2026

(51) Int. Cl.
*H04L 41/14* (2022.01)
*H04L 45/00* (2022.01)

(52) U.S. Cl.
CPC .............. *H04L 41/14* (2013.01); *H04L 45/46* (2013.01)

(58) Field of Classification Search
None
See application file for complete search history.

(56) References Cited

U.S. PATENT DOCUMENTS 9,974,043 B1 * 5/2018 Patwardhan .......... H04W 24/04
11,671,436 B1 * 6/2023 Xu .......................... G06F 18/24 726/22
2005/0286434 A1 * 12/2005 McKee ................. H04L 43/022 370/252
2017/0034720 A1 * 2/2017 Gopalakrishnan .... H04W 16/18
2018/0227210 A1 * 8/2018 Cosgrove ................ H04L 43/16
2018/0352532 A1 * 12/2018 Patwardhan .......... H04W 16/18
2021/0241227 A1 * 8/2021 Ma ......................... G06F 16/285
2023/0297651 A1 * 9/2023 Mehta ................. G06F 18/2323 382/181
2025/0358195 A1 * 11/2025 Kote ..................... H04L 41/145

OTHER PUBLICATIONS

Wikipedia, Floor and Ceiling functions, pp. 1-16, https://en.wikipedia.org/wiki/Floor_and_ceiling_functions (Year: 2026).*

* cited by examiner

*Primary Examiner* — Backhean Tiv
(74) *Attorney, Agent, or Firm* — Foley & Lardner LLP

(57) ABSTRACT

Systems and methods for network element clustering include identifying a plurality of network elements, each network element configured to send and receive a plurality of data packets across a communications network, assigning each network element of the plurality of network elements to a cluster of a first plurality of clusters according to a location of each network element, determining a distance between each network element assigned to a cluster and a centroid of the cluster, executing an optimization algorithm using the distances to reassign the plurality of network elements to clusters of a second plurality of clusters that reduces a cost value of the optimization algorithm, generating a matrix indicating an assignment of each network element of the plurality of network elements to a cluster of the second plurality of clusters, and routing one or more data packets received from the plurality of network elements according to the generated matrix.

18 Claims, 6 Drawing Sheets

SYSTEMS AND METHODS FOR NETWORK ELEMENT CLUSTERING FOR RAN MONITORING

CROSS-REFERENCE TO RELATED APPLICATIONS

This application claims the benefit of Paris Convention priority to PCT International Patent Application No.: PCT/CN2024/132680, filed Nov. 18, 2024, the entirety of which is incorporated by reference herein.

BACKGROUND

Network elements in a network may be assigned to a particular cluster of network elements such that network traffic to and from the network elements is monitored.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
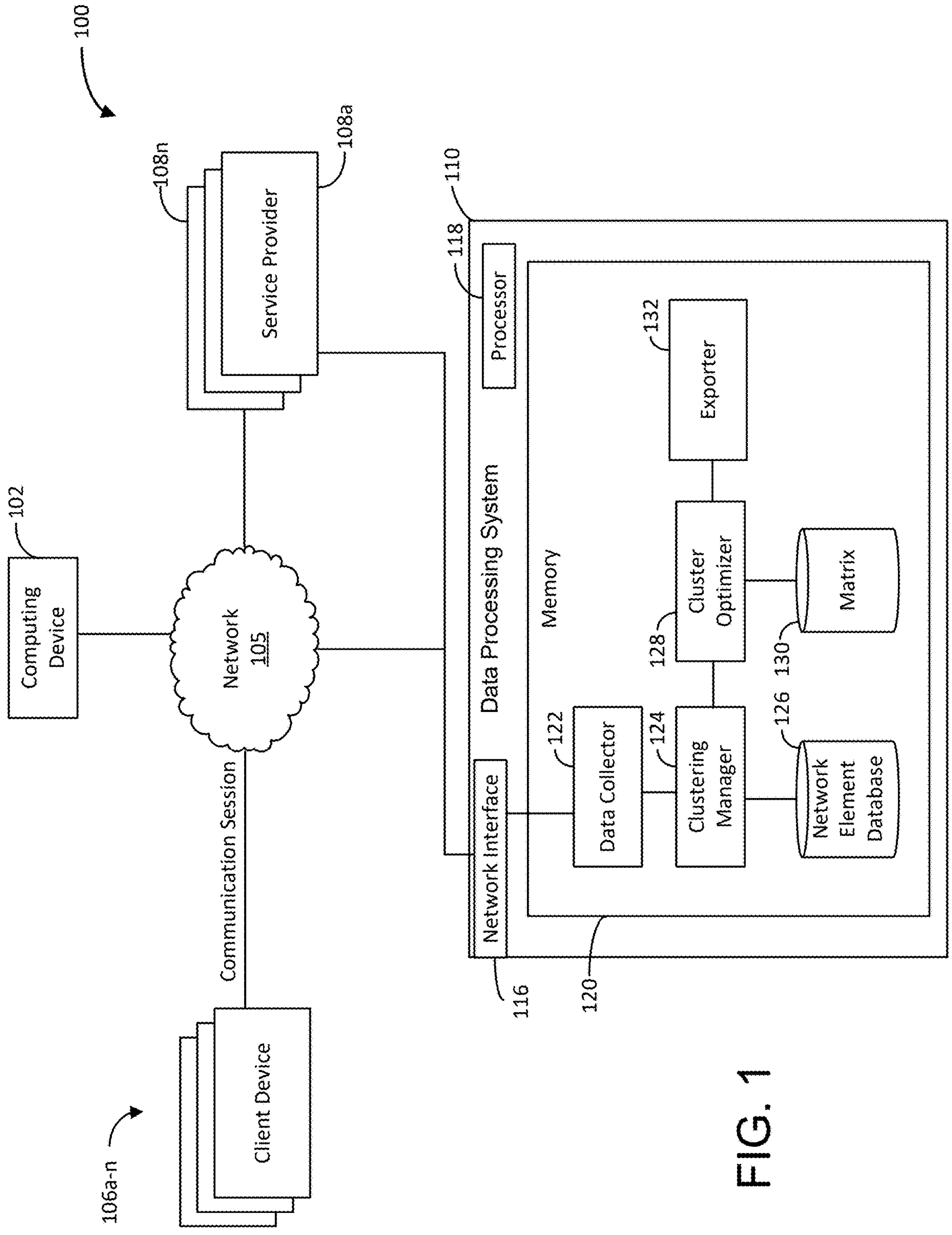
FIG. 1 is an illustration of a system for network element clustering, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The systems and methods described herein may provide efficient and accurate radio access network (RAN) monitoring. In a RAN, network elements (NEs) may be partitioned or grouped into different clusters, and different probes may be assigned to monitor different clusters. In order to allow the probes to efficiently and accurately monitor the network, it may be desirable for the NEs to be partitioned such that adjacent elements are partitioned into the same cluster and each cluster has an equal or near-equal amount of NEs.

Conventional methods of NE clustering include round-robin and K-means distribution. In round-robin distribution, network elements are distributed evenly across all clusters in the network. However, adjacent network elements may not be partitioned into the same cluster. In K-means distribution, adjacent NEs may be assigned to the same cluster. However, the resulting clusters may not be balanced in the number of NEs assigned to each cluster.

For wireless network monitoring with large amount of NEs, proper clustering of NEs is important for effective load balancing among monitoring devices (e.g., probes). When network elements are improperly or unevenly clustered/distributed, a single probe assigned to a cluster having a larger number of network elements may monitor a large number of data packets relative to another probe. For example, a probe may monitor a large number of data packets due to the cluster including a large number of network elements. Analyzing a large number of data packets may overwhelm the probe and cause processing delays, delays in data packet transmission, and increased computing power expended by the overwhelmed probe. Effective load balancing relies on both cohesive partitioning of NEs based on a geolocation of each NE, as well as balanced sizing of resultant clusters.

The systems and methods described herein addresses above challenges by creating and solving an optimization problem to determine optimal clustering of the NEs in a network, thereby achieving both cohesive and balanced clustering. For example, the system assigns network elements to a first cluster based on a location of each network element, so network elements located proximate one another are clustered together. The system may then determine a distance between each network element and a centroid or center point of the network element's assigned cluster.

The system may then execute an optimization algorithm using the determined distances. The optimization algorithm may be used to reassign the network elements to new or different clusters. The assignments to new clusters may be determined such that a cost value of the optimization algorithm is reduced. For example, the optimization algorithm may determine a cluster for each network element that minimizes a distance between the network element and the assigned cluster center. The system may generate a matrix indicating an assignment of each network element to a cluster. The system may then route data packets from the network elements according to the assignments indicated by the generated matrix.

This process may cause the network elements to be assigned to clusters in a manner that causes the network elements to be evenly distributed. Thus, each probe assigned to a different cluster may monitor roughly the same number of network elements (and therefore generally a balanced distribution of data packets), which may prevent particular probes from processing greater amounts of data. This may reduce overall processing times and computing resources for the network in general as well as for individual probes.

Technically and beneficially, the systems and methods described herein improve an efficiency of RAN monitoring by evenly distributing a load of the NEs among different probes. The systems and methods also improve an effectiveness of RAN monitoring due to the traffic from adjacent NEs being grouped and processed together to address mobility scenarios like handover and aggregation.

FIG. 1 is an illustration of a system 100 for network element clustering, in accordance with an implementation.

The system 100 may determine optimal placement of network elements in different clusters and an optimal size of each cluster for improved network monitoring and performance. In brief overview, the system 100 can include, access, or otherwise interface with one or more of a data processing system 110 (e.g., a probe, an inspection device), that receives and/or stores data packets transmitted via a network 105 between client devices 106*a-n* (hereinafter client device 106 or client devices 106) and service providers 108*a-n*. The service providers 108 can each include a set of one or more servers 402, depicted in FIG. 4A, or a data center 408. The client device 106 may be an example of a user equipment (UE) or another device that can access the network 105. The client device 106 can communicate with the service providers 108 to access a service (e.g., a website, an application, etc.). The client device 106, the service provider 108, and the data processing system 110 can communicate or interface with via the network 105 or directly.

Each of the client devices 106, the service providers 108, the computing device 102, and/or the data processing system 110 can include or utilize at least one processing unit or other logic device such as programmable logic array engine, or module configured to communicate with one another or other resources or databases. The components of the client devices 106, the service providers 108, the computing device 102, and/or the data processing system 110 can be separate components or a single component. In some embodiments, the data processing system 110 may be an intermediary device between the client devices 106 and the service providers 108. In some embodiments, the computing device 102 may be an external device (e.g., a security device, a monitoring device, etc.). In some embodiments, the computing device 102, the service provider 108, the data processing system 110, or any combination thereof, may share at least some components or be the same device. The system 100 and its components can include hardware elements, such as one or more processors, logic devices, or circuits.

The client devices 106, the service providers 108, the computing device 102, and/or the data processing system 110 can include or execute on one or more processors or computing devices (e.g., the computing device 403 depicted in FIG. 4C) and/or communicate via the network 105. The network 105 can include computer networks such as the Internet, local, wide, metro, or other area networks, intranets, satellite networks, and other communication networks such as voice or data mobile telephone networks. Via the network 105, the client device 106 can access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the service providers 108 for data (e.g., a communication session including requests from the client devices 106 and responses from the service providers 108).

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), universal mobile telecommunications system ("UMTS"), 3G, 4G, long term evolution wireless broadband communication ("LTE"), 5G, etc. Different types of data may be transmitted via different protocols, or the same types of data may be transmitted via different protocols. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

The service provider 108 can be hosted by a third-party cloud service provider via a virtual environment. The service provider 108 can be hosted in a public cloud, a co-location facility, or a private cloud. The service provider 108 can be hosted in a private data center, or on one or more physical servers, virtual machines, or containers of an entity or customer. The service providers 108 may each be or include servers or computers configured to transmit or provide services across network 105 to client devices 106. The service providers 108 may transmit or provide such services upon receiving requests for the services from any of the client devices 106. The term "service" as used herein includes the supplying or providing of information over a network and is also referred to as a communications network service. Examples of services include 5G broadband services, any voice, data or video service provided over a network, smart-grid network, digital telephone service, cellular service, Internet protocol television (IPTV), etc. The service may further include a SaaS application, such as a word processing application, spreadsheet application, presentation application, electronic message application, file storage system, productivity application, or any other SaaS application. The service provider 108 can be hosted or refer to cloud 410 depicted in FIG. 4B.

The client device 106 can establish communication sessions with the service providers 108 to receive data from the service providers 108. For example, a user associated with the client device 106 may request a service. Responsive to the request, a cloud provider 108 associated with the service may send requested data to the client device 106 in a communication session. The requested data may be communicated between the client device 106 and the service providers 108 via a plurality of data packets. Network elements within the network 105 may be configured to facilitate the transmission of data packets and, therefore, communication between the client devices 106 and the service providers 108. Data packets may be routed to different network elements within the network 105. Data packets may be distributed among different network elements (and different clusters) to prevent uneven load distribution. For example, a probe may be configured to monitor multiple network elements. When data packets are evenly or near-evenly distributed among network elements, individual probes may be prevented from being overwhelmed with data packets (e.g., each probe in the network 105 analyzes a generally similar number of data packets).

The client device 106 can be located or deployed at any geographic location in the network environment depicted in FIG. 1. The client device 106 can be deployed, for example, at a geographic location where a typical user using the client device 106 would seek to connect to a network (e.g., access a browser or another application that requires communication across a network). For example, a user can use a client device 106 to access the Internet at home, as a passenger in a car, while riding a bus, in the park, at work, while eating at a restaurant, or in any other environment. The client device 106 can be deployed at a separate site, such as an availability zone managed by a public cloud provider (e.g., a cloud 410 depicted in FIG. 4B). If the client device 106 is deployed in a cloud 410, the client device 106 can include or be referred to as a virtual client device or virtual machine. In the event the client device 106 is deployed in a cloud 410, the packets exchanged between the client device 106 and the service providers 108 can still be retrieved by the data processing system 110 from the network 105. The computing device 102 may be similar to client devices 106. In some cases, the client devices 106 and/or the data processing system 110 can be deployed in the cloud 410 on the same computing host in an infrastructure 416 (described below with respect to FIG. 4B).

The data processing system 110 may comprise one or more processors that are configured to obtain network data packets from the service providers 108 during a communication session between the client device 106 and the service providers 108 and expose response codes associated with the network data packets. The data processing system 110 may comprise a network interface 116, a processor 118, and/or memory 120. The data processing system 110 may communicate with any of the computing device 102, the client devices 106, and/or the service providers 108 via the network interface 116. The processor 118 may be or include an ASIC, one or more FPGAs, a DSP, circuits containing one or more processing components, circuitry for supporting a microprocessor, a group of processing components, or other suitable electronic processing components. In some embodiments, the processor 118 may execute computer code or modules (e.g., executable code, object code, source code, script code, machine code, etc.) stored in the memory 120 to facilitate the operations described herein. The memory 120 may be any volatile or non-volatile computer-readable storage medium capable of storing data or computer code.

The memory 120 may include one or more of a data collector 122, a clustering manager 124, a network element database 126, a cluster optimizer 128, a partition matrix 130, and an exporter 132. The data processing system 110 may further include other components, managers, handlers, etc. to perform the techniques as described herein. In brief overview, the components 122-132 may identify a plurality of network elements. Each network element may be configured to send and receive a plurality of data packets across a communications network (e.g., the network 105). The components 122-132 may assign each network element to a cluster according to a location of each network element. The components 122-132 may determine a distance between each network element assigned to a cluster and a centroid (e.g., a center point) of the cluster. The components 122-132 may execute an optimization algorithm using the determined distances to reassign the network elements to new clusters that reduce a cost value of the optimization algorithm. The components 122-132 may route data packets to the appropriate network element according to the location of the network element according to the generated matrix.

The data collector 122 may comprise programmable instructions that, upon execution, cause the processor 118 to obtain (e.g., receive, collect) data transmitted between the client devices 106 and the service providers 108 as part of a communication session. For example, the client device 106 may send and/or receive data to a service provider 108 via data packets. Network elements may receive the data packets from the sending party to route them to the correct recipient. The data collector 122 may collect the data packets and/or the information contained in the data packets. The data collector 122 may transmit the data packets to the exporter 134 that exports the data packets to the proper recipient.

The clustering manager 124 may comprise programmable instructions that, upon execution, cause the processor 118 to partition the NEs into a first or initial cluster set. That is, the clustering manager 124 may perform or execute an algorithm to cluster all of the NEs of the system 100 into different clusters. The clustering manager 124 may retrieve information about each of the NEs in the network from the network element database 126. Information about each NE may include, for example, a geolocation of the NE, latitude and longitude coordinates of the NE, an identifier of the NE, etc.

In various embodiments, the clustering manager 124 may perform the initial clustering using a K-means algorithm. The K-means clustering method may cluster together NEs that are proximate one another so that NEs within a defined area are placed in the same cluster. However, the initial set of clusters may be unbalanced. That is, the same or relatively the same number of NEs may not be assigned to each cluster. For example, the clustering manager 124 may partition all of the NEs in the system 100 into four different clusters. NEs may be assigned to the same cluster when they are within a defined distance of one another, within predefined geographic boundaries, etc. As such, the each of the four clusters may have, for example, 234, 492, 381, and 416 NEs assigned, respectively (indicating that the K-means clustering generates unbalanced clusters).

Upon performing the initial clustering, the clustering manager 124 may transmit information indicating an cluster assignment for each NE to the network element database 126. In some embodiments, the clustering manager 124 may input the results of the initial clustering into a matrix format. In some implementations, the resultant matrix P may be stored in the partition matrix database 130. Each row of the matrix P represents a different network element to be monitored, and each column of the matrix P represents a different cluster within the network. The matrix P will be described in greater detail below.

The cluster optimizer 128 may comprise programmable instructions that, upon execution, cause the processor 118 to perform an optimization to balance the number of NEs assigned to each of the clusters generated by the clustering manager 124. In some embodiments, the cluster optimizer 128 may generate or determine an optimization problem. Specifically, the optimization problem may be a combinatorial optimization problem. The cluster optimizer 128 may be or include one or more solvers (e.g., a general purpose solver) that can solve the optimization problem to determine or derive, from the solution to the optimization problem, the desired or optimal clustering of NEs in the network.

Using or based on the initial clusters generated by the clustering manager 124, the cluster optimizer 128 may model, determine, generate, etc., an optimization problem to minimize a sum of all distances between each NE and a center or centroid of the corresponding or assigned cluster.

In some embodiments, the distances the cluster optimizer 128 seeks to minimize are Euclidean distances. The Euclidean distances may be based on a geolocation of each NE. For example, a distance between a NE and the center of its assigned cluster may be calculated or determined based on the latitude and longitude of the NE and/or the center of the cluster.

The cluster optimizer 128 may generate a matrix P indicating an assignment of each NE (represented as $X_i$) to a cluster. The matrix may also be referred to herein as a partition matrix or an assignment matrix. The matrix may be of the size n×k, where n is a number of network elements in the network and k is the number of clusters in the network, and where n×k indicates a row×column size. In some embodiments, the value of k may be determined based on the number of clusters generated by the clustering manager 124 during the initial clustering process. Each position within the matrix P may be represented by $P_{i,j}$, where i indicates a row position and j represents a column position within the matrix P. Each network element $X_i$ represents a different element in the i dimension of the matrix (e.g., each network element $X_i$ is a different row element). For example, network element $X_2$ may be located in the second row of the matrix P. Each cluster $C_j$ represents a different cluster in the j dimension of the matrix (e.g., each cluster $C_j$ is a different column element). For example, cluster $C_3$ may be located in the third column in the matrix P. When a particular network element $X_i$ is assigned to a cluster $C_j$, $P_{i,j}$ for the corresponding row, column cell is equal to 1. When $X_i$ is not assigned to a cluster $C_j$, $P_{i,j}$ for the corresponding row, column cell is equal to zero. For example, if network element $X_2$ is located in cluster $C_3$, $P_{2,3}$ may be equal to 1.

An objective function of the optimization problem to be solved by the cluster optimizer 128 may be solved by determining, for each network element, a product of the distance between the network element and the centroid of the assigned cluster of the NE and each cell value in the generated matrix. The cluster optimizer 128 may then sum each of the products in a first dimension of the matrix (e.g., the i dimension), and subsequently sum the summed products in a second dimension of the matrix (e.g., the j dimension). The objective function may be modeled by the following equation (1):

$$\text{Minimize } E = \sum_{j=1}^{k}\sum_{i=1}^{n} P_{i,j}\|X_i - c_j\|^2 \quad (1)$$

In Equation (1), X represents the set of n NEs to be monitored, $X_i$ represents each specific NE to be monitored, k represents the number of generated or desired clusters, $P_{i,j}$ is the assignment matrix, $C_j$ represents each cluster generated or produced by the cluster optimizer 128 solving the optimization problem, and $\|X_i-c_j\|^2$ represents a distance (e.g., a Euclidean distance) between $X_i$ and $c_j$, where $c_j$ represents a center of a cluster $C_j$.

In various embodiments, the cluster optimizer 128 may calculate the center $c_j$ by determining an average of the geolocations (e.g., latitude and longitude coordinates) of all elements assigned to that cluster. The cluster optimizer 128 may calculate the center $c_j$ using the following Equation (2):

$$\frac{1}{m}\sum_{i=1}^{m} X_i \quad (2)$$

where m represents a number of geolocations of elements assigned to a cluster and Xi represents each specific NE to be monitored.

In some embodiments, the cluster optimizer 128 may pre-calculate or predetermine one or more of the geocoordinates, the Euclidean distance, and/or the center of each cluster. In some implementations, the geocoordinates may be treated as constant coefficients in Equation (1).

The optimization problem may use the clusters and NE assignments generated by the initial clustering performed by the clustering manager 124 as a basis or starting point for finally determining NE assignments to different clusters. That is, the cluster optimizer 128 may adjust the NE cluster assignments so that NEs are evenly or near-evenly distributed among the clusters, and are appropriately assigned to a cluster based on geocoordinates.

The optimization problem may include one or more constraints within which the objective function (1) should be optimized. A first constraint may state that each NE may be assigned to only one cluster (e.g., a single NE cannot belong to more than one cluster). This constraint may be modeled by the following Equation (3):

$$\sum_{j=1}^{k} P_{i,j} = 1,\quad 1 \le i \le n \quad (3)$$

When $P_{i,j}$ cell values in each row are summed in the j dimension, the sum of all elements in each row of the matrix should be equal to one. Therefore, each NE should be assigned to a cluster, and no NE can be assigned to multiple clusters.

A second constraint of the objective function may state that a total number of NEs assigned to a particular cluster may fall within an upper limit and a lower limit. Specifically, when the cluster optimizer 128 balances the clusters (e.g., solves the optimization problem), the size of each cluster may be equal to n/k. For example, when n=50 (e.g., 50 NEs are in a network) and k=5 (e.g., the network is partitioned into five clusters), n/k=10, indicating that 10 NEs are assigned to each of the five clusters. In some embodiments, the number of NEs to be monitored may not be evenly divided by the number of clusters in the network. For example, the network may have n=100 NEs and k=3 clusters. In such a scenario, n/k=$33.\overline{3}$. The cluster optimizer 128 may, responsive to determining that a value of n/k is not a whole number value, determine floor and ceiling values of n/k. That is, the cluster optimizer 128 may determine the two whole numbers nearest the n/k value, one less than the n/k value and one greater than the n/k value, and assign the values as floor and ceiling values of n/k, respectively. For example, when n/k=33.3, the cluster optimizer 128 may determine that a floor value of n/k is 33 and that a ceiling value of n/k is 34.

The second constraint for the optimization problem may be that each cluster in the network is to have either 33 or 34 NEs assigned. The second constraint may be modeled by the following Equation (4):

$$\lfloor n/k \rfloor \le \sum_{i=1}^{n} P_{i,j} \le \lceil n/k \rceil,\quad 1 \le j \le k \quad (4)$$

When $P_{i,j}$ cell values in each row are summed in the i dimension, the sum of all elements in each column of the matrix should be between a floor value of n/k and a ceiling value of n/k (or, when the number of NEs is divisible by the number of clusters, the sum of all elements in each column should be n/k).

The objective function and corresponding constraints can be modeled as:

$$\text{Minimize } E = \sum_{j=1}^{k}\sum_{i=1}^{n} P_{i,j}\|X_i - c_j\|^2 \quad (1)$$

$$\sum_{j=1}^{k} P_{i,j} = 1,\ 1 \le i \le n \quad (4)$$

$$\text{s.t. floor}\left(\frac{n}{k}\right) \le \sum_{i=1}^{n} P_{i,j} \le \text{ceil}\left(\frac{n}{k}\right),\ 1 \le j \le k \quad (5)$$

$$0 \le P_{i,j} \le 1,\ 1 \le j \le k,\ 1 \le i \le n \quad (6)$$

such that the cluster optimizer 128 assigns NEs to clusters in a manner than satisfies the above constraints. As previously stated, the output of the solved optimization problem may be an assignment matrix indicating the balanced clustering of the NEs in a network. The assignment matrix generated by the cluster optimizer 128 may be stored in a matrix database 130.

In some implementations, the cluster optimizer 128 may convert the equations 1-6 generated by the cluster optimizer 128 into program code executable by the data processing system 110. For example, as the cluster optimizer 128 solves the optimization problem, the equations used may be converted into program code so that the cluster optimizer 128 can execute the optimization.

The exporter 132 may comprise executable instructions that, upon execution by the processor 118, may route one or more data packets received from one or more NEs according to the matrix generated by the cluster optimizer 128. For example, the exporter 132 may retrieve or receive the generated matrix from the matrix database 130. The exporter 132 may route data packets received by the data collector 122 to the various NEs that have been assigned to the appropriate cluster so that the data packets (e.g., network traffic) are properly transmitted to and from the correct NE.

Figure 2:
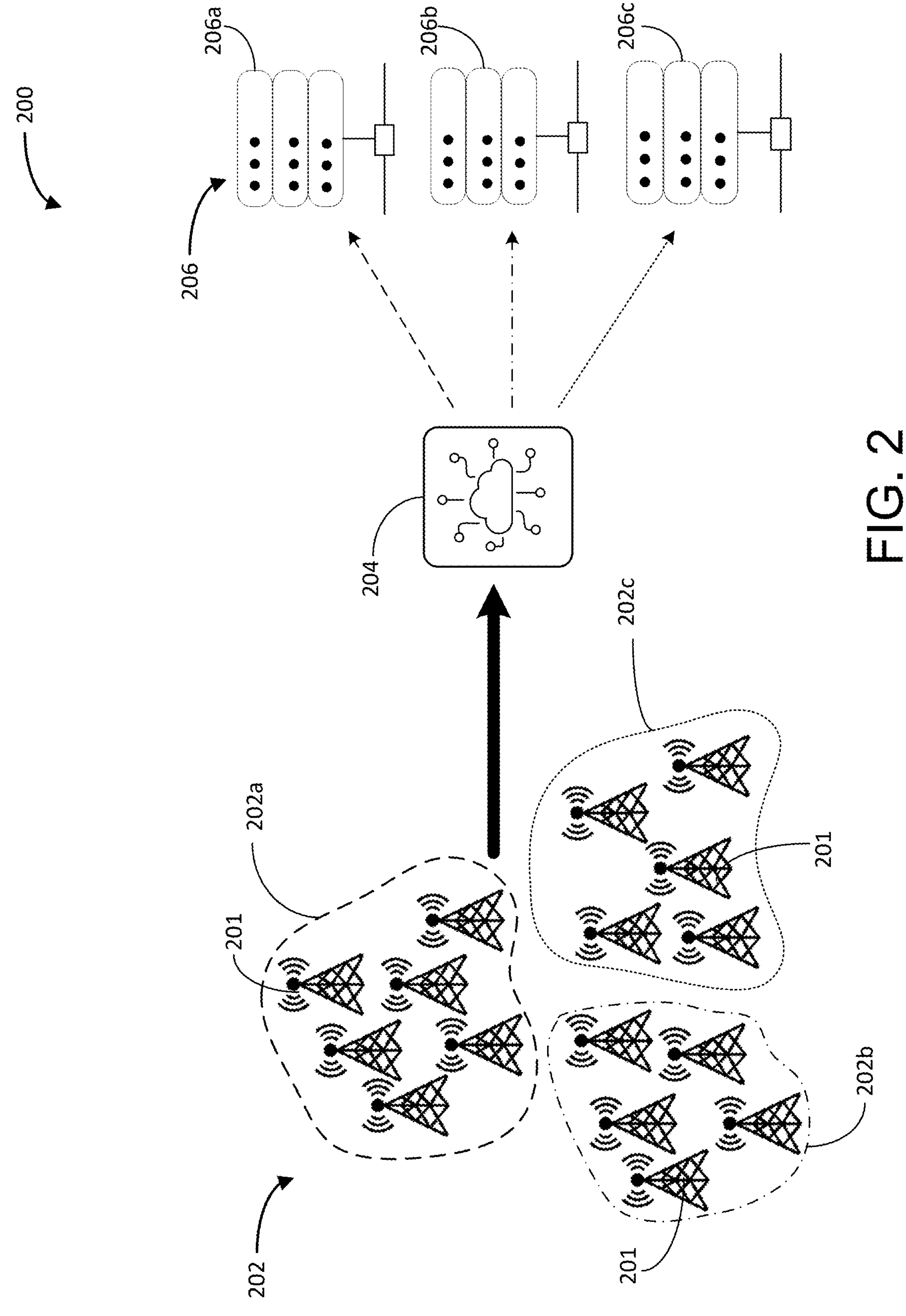
FIG. 2 is an illustration of a system for network element clustering, in accordance with an implementation.

FIG. 2 is an illustration of a system 200 for illustrating network element clustering. The system 200 includes a plurality of network elements 201. The network elements may be, for example, base stations, nodes, etc. For example, in a 5G network, the network elements 201 may be gNodeBs. The network elements 201 may be divided into a plurality of clusters 202. As shown in the system 200, distribution of the network elements 201 may have been previously optimized such that an even or near-even number of network elements 201 are assigned to each of the clusters 202*a*. 202*b*, and 202*c*.

Each of the network elements 201 may transmit data packets, such that network traffic occurs in the network. The traffic broker 204 may route the data packets to the appropriate monitoring device 206 depending on the cluster assigned to the particular network element 201 transmitting the data packet. The traffic broker 204 may be the same as or similar to the data processing system 110. For example, the traffic broker 204 may also perform cluster optimization as described with respect to FIG. 1. Upon appropriately assigning the network elements 201 to the cluster 202, the monitoring devices 206 may monitor network traffic associated with network elements assigned to the corresponding cluster. For example, each monitoring device 206 may be configured to monitor network traffic and/or data packets transmitted to and from network elements 201 in a particular cluster. For example, the monitoring device 206*a* may be configured to monitor network traffic from network elements 201 assigned to the cluster 202*a*, the monitoring device 206*b* may be configured to monitor network traffic from network elements 201 assigned to the cluster 202*b*, and the monitoring device 206*c* may be configured to monitor network traffic from network elements 201 assigned to the cluster 202*c*.

In a situation in which one of the clusters 202 was assigned a disproportionately large number of network elements 201 relative to the other clusters 202, the corresponding monitoring device 206 may experience increased processing times, increased memory usage, reduced computer storage capacity, etc. By assigning each cluster 202 a similar number of network elements, data packet allocation among clusters (and therefore among probes assigned to monitor different clusters) is balanced. For example, the optimization algorithm described above ensures that network elements are evenly or near-evenly distributed, causing analysis of data packets to be evenly or near-evenly distributed among probes. This may reduce the processing times and memory usage, as well as increase the computer storage capacity, thereby improving efficiency of the system 100 (e.g., the network 105 and/or the data processing system 110).

Figure 3:
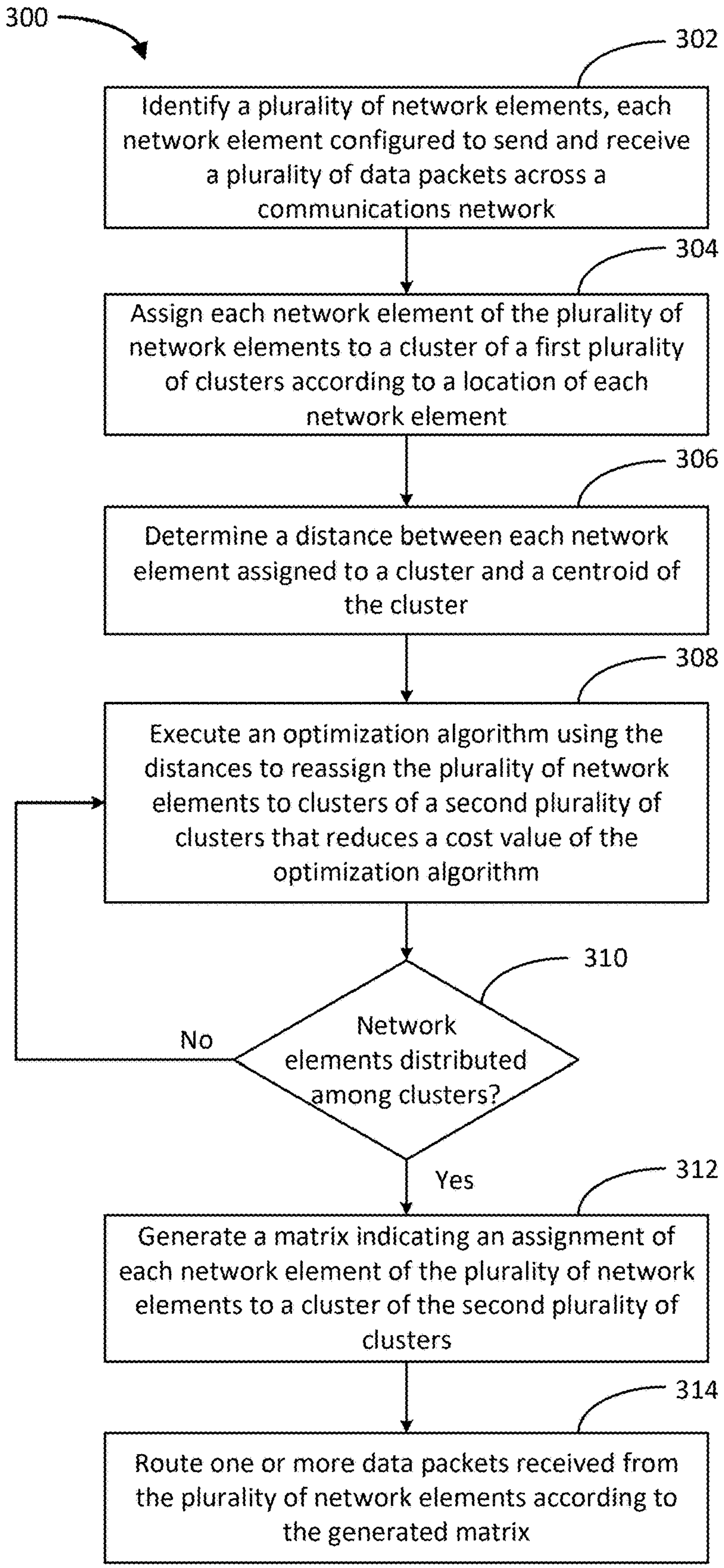
FIG. 3 is an illustration of a flow diagram of a process for network element clustering, in accordance with an implementation.

FIG. 3 is an illustration of a flow diagram of a process 300 for service response analysis, in accordance with an implementation. The process 300 can be performed by a data processing system (the data processing system 110, shown and described with reference to FIG. 1). The process 300 may include more or fewer operations and the operations may be performed in any order. Performance of the process 300 may enable the data processing system to expose response codes to a monitoring device.

At operation 302, the data collector 122 identifies a plurality of network elements within a communications network. In various embodiments, each network element may be configured to send and receive a plurality of data packets across the communications network.

At operation 304, the clustering manager 124 assigns each network element of the plurality of network elements to a cluster of a first plurality of clusters. The clustering manager 124 may assign each network element to a cluster according to a location of each network element. In various embodiments, the clustering manager 124 may assign each network element of the plurality of network elements to a cluster using a K-means clustering method.

At operation 306, the cluster optimizer 128 determines a distance between each network element assigned to a cluster and a centroid of the cluster. In various embodiments, the cluster optimizer 128 may determine a centroid of a cluster by computing an average of geocoordinates of all network elements assigned to the cluster. In some implementations, the distance between each network element assigned to a cluster and a centroid of the cluster is a Euclidian distance.

At operation 308, the cluster optimizer 128 executes an optimization algorithm using the distances determined at operation 306 to reassign the plurality of network elements to clusters of a second plurality of clusters. Reassigning the network elements to clusters of a second plurality of clusters may reduce a cost value of the optimization algorithm.

In some embodiments, executing the optimization algorithm includes determining, for each network element, a product of the distance between the network element assigned to a cluster and the centroid of the cluster and each element in a matrix. The matrix may indicate an assignment of each network element to a cluster. Each element of the matrix identifies an assignment of a network element to a cluster. Executing the optimization algorithm may further include summing each of the products in a first direction of the matrix, and summing the summed products in a second direction of the matrix.

In various implementations, summing each of the products in the first direction includes summing products in each row of the matrix. Each row may correspond to a network element. In some embodiments, summing the summed products in a second direction of the matrix includes summing each column of the matrix. Each column of the matrix may correspond to a generated cluster of the network.

In some embodiments, the optimization algorithm may have associated constraints. A first constraint of an objective function of the optimization algorithm may states that each network element is assigned to only one cluster. The first constraint may be defined as the sum of all elements in each row of the matrix to be generated being equal to one.

In some embodiments, a second constraint of the objective function may state that a total number of network elements assigned to a cluster is within n/k, where n is a total number of network elements within the network and k is the number of clusters to be generated. The second constraint may be defined as the sum of all elements in each column of the matrix being between a floor value of n/k and a ceiling value of n/k.

At operation 310, the cluster optimizer 128 determines whether network elements are distributed among the clusters. Specifically, the cluster optimizer 128 may determine whether the network elements are distributed evenly or near-evenly among the clusters. Responsive to a determination at operation 310 that the network elements are not distributed among the clusters, the method 300 returns to operation 308. Responsive to a determination at operation 310 that the network elements are distributed among the clusters, the method 300 continues to operation 312.

At operation 312, the cluster optimizer 128 generates a matrix indicating an assignment of each network element of the plurality of network elements to a cluster of the second plurality of clusters.

At operation 314, the exporter 132 routes one or more data packets received from the plurality of network elements according to the matrix generated at operation 312.

Figure 4A:
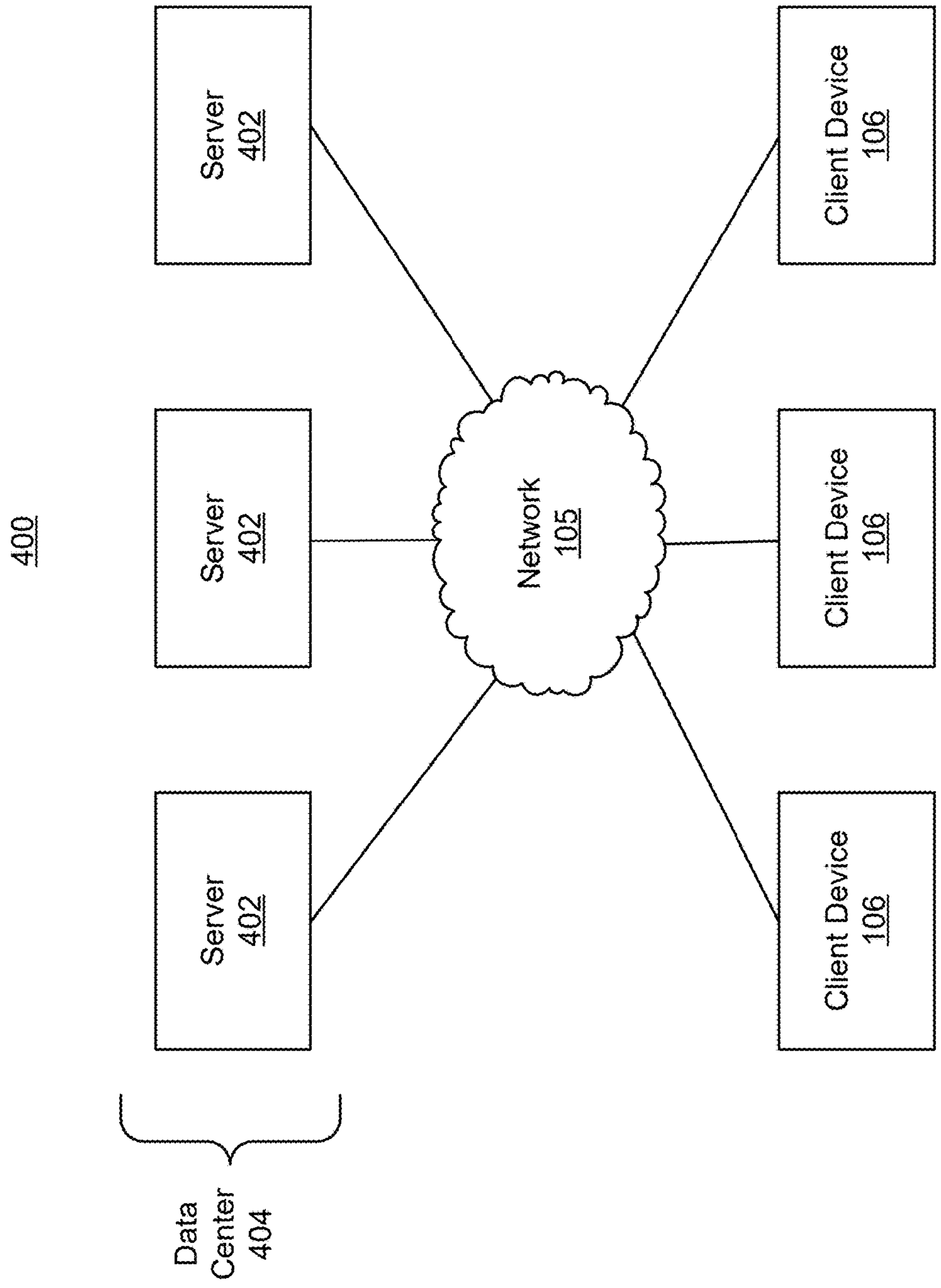
FIG. 4A is a block diagram depicting an implementation of a network environment including a client device in communication with a server device.

FIG. 4A depicts an example network environment that can be used in connection with the methods and systems described herein. In brief overview, the network environment 400 includes one or more client devices 106 (also generally referred to as clients, client node, client machines, client computers, client computing devices, endpoints, or endpoint nodes) in communication with one or more servers 402 (also generally referred to as servers, nodes, or remote machine) via one or more networks 105. In some embodiments, a client 106 has the capacity to function as both a client node seeking access to resources provided by a server and as a server providing access to hosted resources for other client devices 106.

Although FIG. 4A shows a network 105 between the client devices 106 and the servers 402, the client devices 106 and the servers 402 can be on the same network 105. In embodiments, there are multiple networks 105 between the client devices 106 and the servers 402. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods e.g., FDMA, TDMA, CDMA, or SDMA. In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN), e.g., Intranet, a metropolitan area network (MAN), a wide area network (WAN), or the Internet. The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 400 can include multiple, logically grouped servers 402. The logical group of servers can be referred to as a data center 408 (or server farm or machine farm). In embodiments, the servers 402 can be geographically dispersed. The data center 408 can be administered as a single entity or different entities. The data center 408 can include multiple data centers 408 that can be geographically dispersed. The servers 402 within each data center 408 can be homogeneous or heterogeneous (e.g., one or more of the servers 402 or machines 402 can operate according to one type of operating system platform (e.g., WINDOWS NT, manufactured by Microsoft Corp. of Redmond, Washington), while one or more of the other servers 402 can operate on according to another type of operating system platform (e.g., Unix, Linux, or Mac OS X)). The servers 402 of each data center 408 do not need to be physically proximate to another server 402 in the same machine farm 408. Thus, the group of servers 402 logically grouped as a data center 408 can be interconnected using a network. Management of the data center 408 can be de-centralized. For example, one or more servers 402 can comprise components, subsystems and modules to support one or more management services for the data center 408.

Server 402 can be a file server, application server, web server, proxy server, appliance, network appliance, gateway, gateway server, virtualization server, deployment server, SSL VPN server, or firewall. In embodiments, the server 402 can be referred to as a remote machine or a node. Multiple nodes can be in the path between any two communicating servers.

Figure 4B:
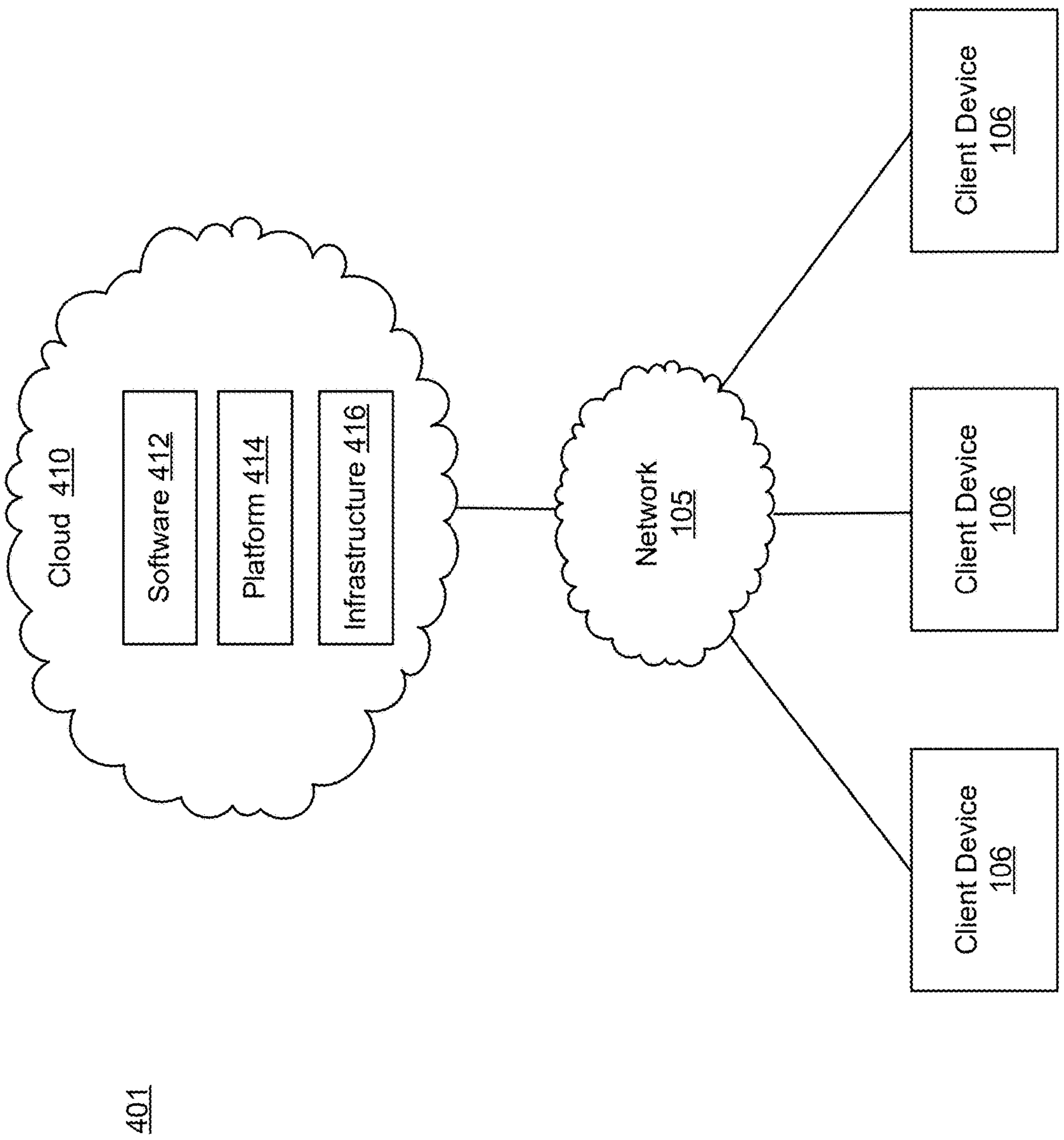
FIG. 4B is a block diagram depicting a cloud computing environment including a client device in communication with cloud service providers.

FIG. 4B illustrates an example cloud computing environment. A cloud computing environment 401 can provide client 106 with one or more resources provided by a network environment. The cloud computing environment 401 can include one or more client devices 106, in communication with the cloud 410 over one or more networks 105. Client devices 106 can include, e.g., thick clients, thin clients, and zero clients. A thick client can provide at least some functionality even when disconnected from the cloud 410 or servers 402. A thin client or a zero client can depend on the connection to the cloud 410 or server 402 to provide functionality. A zero client can depend on the cloud 410 or other networks 105 or servers 402 to retrieve operating system data for the client device. The cloud 410 can include back-end platforms, e.g., servers 402, storage, server farms or data centers.

The cloud 410 can be public, private, or hybrid. Public clouds can include public servers 402 that are maintained by third parties to the client devices 106 or the owners of the clients. The servers 402 can be located off-site in remote geographical locations as disclosed above or otherwise. Public clouds can be connected to the servers 402 over a public network. Private clouds can include private servers 402 that are physically maintained by client devices 106 or owners of clients. Private clouds can be connected to the servers 402 over a private network 105. Hybrid clouds 408 can include both the private and public networks 105 and servers 402.

The cloud 410 can also include a cloud-based delivery, e.g., Software as a Service (Saas) 412, Platform as a Service (PaaS) 414, and the Infrastructure as a Service (IaaS) 416. IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client 106 and server 402 can be deployed as and/or executed on any type and form of computing device, e.g., a computer, network device or appliance capable of communicating on any type and form of network and performing the operations described herein.

Figure 4C:
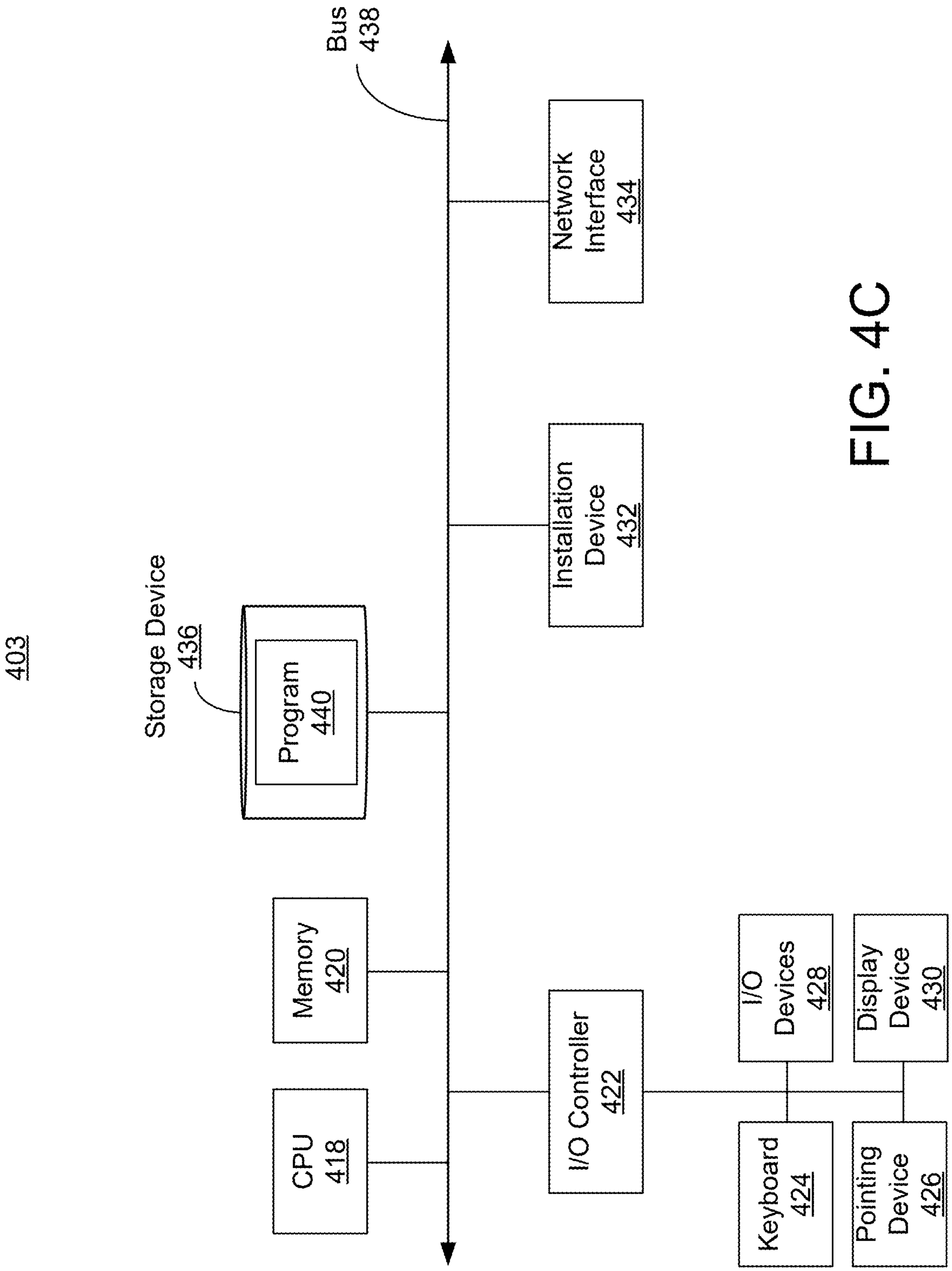
FIG. 4C is a block diagram depicting an implementation of a computing device that can be used in connection with the systems depicted in FIGS. 1 and 2, and the method depicted in FIG. 3.

FIG. 4C depicts block diagrams of a computing device 403 useful for practicing an embodiment of the client 106 or a server 402. As shown in FIG. 4C, each computing device 403 can include a central processing unit 418, and a main memory unit 420. As shown in FIG. 4C, a computing device 403 can include one or more of a storage device 436, an installation device 432, a network interface 434, an I/O controller 422, a display device 430, a keyboard 424 or a pointing device 426, e.g., a mouse. The storage device 436 can include, without limitation, a program 440, such as an operating system, software, or software associated with system 100.

The central processing unit 418 is any logic circuitry that responds to and processes instructions fetched from the main memory unit 420. The central processing unit 418 can be provided by a microprocessor unit, e.g.: those manufactured by Intel Corporation of Mountain View, California. The computing device 403 can be based on any of these processors, or any other processor capable of operating as described herein. The central processing unit 418 can utilize instruction level parallelism, thread level parallelism, different levels of cache, and multi-core processors. A multi-core processor can include two or more processing units on a single computing component.

Main memory unit 420 can include one or more memory chips capable of storing data and allowing any storage location to be directly accessed by the microprocessor 418. Main memory unit 420 can be volatile and faster than storage 436 memory. Main memory units 420 can be Dynamic random-access memory (DRAM) or any variants, including static random access memory (SRAM). The memory 420 or the storage 436 can be non-volatile; e.g., non-volatile read access memory (NVRAM). The memory 420 can be based on any type of memory chip, or any other available memory chips. In the example depicted in FIG. 4C, the processor 418 can communicate with memory 420 via a system bus 438.

A wide variety of I/O devices 428 can be present in the computing device 403. Input devices 428 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 428 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 428, display devices 430 or group of devices can be augmented reality devices. The I/O devices can be controlled by an I/O controller 422 as shown in FIG. 4C. The I/O controller 422 can control one or more I/O devices, such as, e.g., a keyboard 424 and a pointing device 426, e.g., a mouse or optical pen. Furthermore, an I/O device can also provide storage and/or an installation device 432 for the computing device 403. In embodiments, the computing device 403 can provide USB connections (not shown) to receive handheld USB storage devices. In embodiments, an I/O device 428 can be a bridge between the system bus 438 and an external communication bus, e.g., a USB bus, a SCSI bus, a FireWire bus, an Ethernet bus, a Gigabit Ethernet bus, a Fibre Channel bus, or a Thunderbolt bus.

In embodiments, display devices 430 can be connected to I/O controller 422. Display devices can include, e.g., liquid crystal displays (LCD), electronic papers (e-ink) displays, flexile displays, light emitting diode displays (LED), or other types of displays. In some embodiments, display devices 430 or the corresponding I/O controllers 422 can be controlled through or have hardware support for OPENGL or DIRECTX API or other graphics libraries. Any of the I/O devices 428 and/or the I/O controller 422 can include any type and/or form of suitable hardware, software, or combination of hardware and software to support, enable or provide for the connection and use of one or more display devices 430 by the computing device 403. For example, the computing device 403 can include any type and/or form of video adapter, video card, driver, and/or library to interface, communicate, connect or otherwise use the display devices 430. In embodiments, a video adapter can include multiple connectors to interface to multiple display devices 430.

The computing device 403 can include a storage device 436 (e.g., one or more hard disk drives or redundant arrays of independent disks) for storing an operating system or other related software, and for storing application software programs 440 such as any program related to the systems, methods, components, modules, elements, or functions depicted in FIG. 1, or 2. Examples of storage device 436 include, e.g., hard disk drive (HDD); optical drive including CD drive, DVD drive, or BLU-RAY drive; solid-state drive (SSD); USB flash drive; or any other device suitable for storing data. Storage devices 436 can include multiple volatile and non-volatile memories, including, e.g., solid state hybrid drives that combine hard disks with solid state cache. Storage devices 436 can be non-volatile, mutable, or read-only. Storage devices 436 can be internal and connect to the computing device 403 via a bus 438. Storage device 436 can be external and connect to the computing device 403 via an I/O device 430 that provides an external bus. Storage device 436 can connect to the computing device 403 via the network interface 434 over a network 105. Some client devices 106 may not require a non-volatile storage device 436 and can be thin clients or zero client devices 106. Some storage devices 436 can be used as an installation device 432 and can be suitable for installing software and programs.

The computing device 403 can include a network interface 434 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 403 can communicate with other computing devices 402 via any type and/or form of gateway or tunneling protocol e.g., Secure Socket Layer (SSL) or Transport Layer Security (TLS), QUIC protocol, or the Citrix Gateway Protocol manufactured by Citrix Systems, Inc. of Ft. Lauderdale, Florida. The network interface 434 can include a built-in network adapter, network interface card, PCMCIA network card, EXPRESSCARD network card, card bus network adapter, wireless network adapter, USB network adapter, modem or any other device suitable for interfacing the computing device 403 to any type of network capable of communication and performing the operations described herein.

A computing device 403 of the sort depicted in FIG. 4C can operate under the control of an operating system, which controls scheduling of tasks and access to system resources. The computing device 403 can be running any operating system configured for any type of computing device, including, for example, a desktop operating system, a mobile device operating system, a tablet operating system, or a smartphone operating system.

The computing device 403 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 403 has sufficient processor power and memory capacity to perform the operations described herein. In some embodiments, the computing device 403 can have different processors, operating systems, and input devices consistent with the device.

In embodiments, the status of one or more machines 106, 403 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 403 in response to the CPU 418 executing an arrangement of instructions contained in main memory 420. Such instructions can be read into main memory 420 from another computer-readable medium, such as the storage device 436. Execution of the arrangement of instructions contained in main memory 420 causes the computing device 403 to perform the illustrative processes described herein. One or more processors in a multi-processing arrangement may also be employed to execute the instructions contained in main memory 420. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

At least one aspect relates to a method. The method includes identifying, by one or more processors, a plurality of network elements, each network element configured to send and receive a plurality of data packets across a communications network, assigning, by the one or more processors, each network element of the plurality of network elements to a cluster of a first plurality of clusters according to a location of each network element, determining, by the one or more processors, a distance between each network element assigned to a cluster and a centroid of the cluster, executing, by the one or more processors, an optimization algorithm using the distances to reassign the plurality of network elements to clusters of a second plurality of clusters that reduces a cost value of the optimization algorithm, generating, by the one or more processors, a matrix indicating an assignment of each network element of the plurality of network elements to a cluster of the second plurality of clusters, and routing, by the one or more processors, one or more data packets received from the plurality of network elements according to the generated matrix.

In some embodiments, executing the optimization algorithm includes determining, for each network element, a product of the distance between the network element assigned to a cluster and the centroid of the cluster and each element in the generated matrix, where each element of the generated matrix identifies an assignment of a network element to a cluster. Executing the optimization algorithm further includes summing each of the products in a first direction of the matrix and summing the summed products in a second direction of the matrix.

In some implementations, summing each of the products in the first direction includes summing products in each row of the matrix, each row corresponding to a network element. Summing the summed products in a second direction of the matrix includes summing each column of the matrix, each column corresponding to a generated cluster of the network. In some embodiments, determining a distance between each network element assigned to a cluster and a centroid of the cluster comprises computing an average of geo-coordinates of all network elements assigned to the cluster. The distance may be a Euclidian distance.

In some embodiments, a first constraint of an objective function of the optimization algorithm states that each network element is assigned to one cluster. The first constraint may be defined as the sum of all elements in each row of the matrix to be generated being equal to one. In some embodiments, a second constraint of the objective function states that a total number of network elements assigned to a cluster is within n/k, where n is a total number of network elements within the network and k is the number of clusters to be generated. The second constraint may be defined as the sum of all elements in each column of the matrix to be generated being between a floor value of n/k and a ceiling value of n/k.

In some embodiments, assigning each network element of the plurality of network elements to a cluster includes assigning, by the one or more processors, each network element of the plurality of network elements to a cluster using a K-means clustering method.

At least one aspect relates to a system. The system includes one or more non-transitory computer-readable media storing instruction thereon that, when executed by one or more processors, cause the one or more processors to perform operations including: identifying a plurality of network elements, each network element configured to send and receive a plurality of data packets across a communications network, assigning each network element of the plurality of network elements to a cluster of a first plurality of clusters according to a location of each net work element, determining a distance between each network element assigned to a cluster and a centroid of the cluster, executing an optimization algorithm using the distances to reassign the plurality of network elements to clusters of a second plurality of clusters that reduces a cost value of the optimization algorithm, generating a matrix indicating an assignment of each network element of the plurality of network elements to a cluster of the second plurality of clusters, and routing one or more data packets received from the plurality of network elements according to the generated matrix.

In some embodiments, executing the optimization algorithm includes determining, for each network element, a product of the distance between the network element assigned to a cluster and the centroid of the cluster and each element in the generated matrix, where each element of the generated matrix identifies an assignment of a network element to a cluster. Executing the optimization algorithm further includes summing each of the products in a first direction of the matrix and summing the summed products in a second direction of the matrix. In some embodiments, summing each of the products in the first direction includes summing products in each row of the matrix, each row corresponding to a network element. Summing the summed products in a second direction of the matrix includes summing each column of the matrix, each column corresponding to a generated cluster of the network.

In some embodiments, determining a distance between each network element assigned to a cluster and a centroid of the cluster includes computing an average of geo-coordinates of all network elements assigned to the cluster. In some implementations, a first constraint of an objective function of the optimization algorithm states that each network element is assigned to one cluster. In some implementations, a second constraint of the objective function states that a total number of network elements assigned to a cluster is within n/k, where n is a total number of network elements within the network and k is the number of clusters to be generated.

In some embodiments, assigning each network element of the plurality of network elements to a cluster includes assigning, by the one or more processors, each network element of the plurality of network elements to a cluster using a K-means clustering method.

At least one aspect relates to one or more non-transitory computer-readable storage media. The one or more non-transitory computer-readable storage media store instructions thereon that, when executed by one or more processors, cause the one or more processors to identify a plurality of network elements, each network element configured to send and receive a plurality of data packets across a communications network, assign each network element of the plurality of network elements to a cluster of a first plurality of clusters according to a location of each network element, determine a distance between each network element assigned to a cluster and a centroid of the cluster, execute an optimization algorithm using the distances to reassign the plurality of network elements to clusters of a second plurality of clusters that reduces a cost value of the optimization algorithm, generate a matrix indicating an assignment of each network element of the plurality of network elements to a cluster of the second plurality of clusters, and route one or more data packets received from the plurality of network elements according to the generated matrix.

In some embodiments, executing the optimization algorithm includes determining, for each network element, a product of the distance between the network element assigned to a cluster and the centroid of the cluster and each element in the generated matrix, where each element of the generated matrix identifies an assignment of a network element to a cluster. Executing the optimization algorithm further includes summing each of the products in a first direction of the matrix and summing the summed products in a second direction of the matrix.

In some embodiments, a first constraint of an objective function of the optimization algorithm states that each network element is assigned to one cluster. In some embodiments, a second constraint of the objective function states that a total number of network elements assigned to a cluster is within n/k, where n is a total number of network elements within the network and k is the number of clusters to be generated.

The foregoing detailed description includes illustrative examples of various aspects and embodiments and provides an overview or framework for understanding the nature and character of the claimed aspects and embodiments. The drawings provide illustration and a further understanding of the various aspects and embodiments and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all embodiments, and the described program components can be included in a single hardware or software product.

The phraseology and terminology used herein is for the purpose of description and should not be regarded as limiting. Any references to embodiments or elements or acts of the systems and methods herein referred to in the singular may also embrace embodiments including a plurality of these elements, and any references in plural to any implementation or element or act herein may also embrace embodiments including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A,' only 'B,' as well as both 'A' and 'B.' Such references used in conjunction with "comprising" or other open terminology can include additional items.

The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

identifying, by one or more processors, a plurality of network elements, each network element configured to send and receive a plurality of data packets across a communications network;

assigning, by the one or more processors, each network element of the plurality of network elements to a cluster of a first plurality of clusters according to a location of each network element;

determining, by the one or more processors, a distance between each network element assigned to a cluster and a centroid of the cluster, wherein the centroid of the cluster is computed based on geo-coordinates of network elements assigned to the cluster;

executing, by the one or more processors, an optimization algorithm using the distances to reassign the plurality of network elements to clusters of a second plurality of clusters that reduces a cost value of the optimization algorithm;

generating, by the one or more processors, a matrix indicating an assignment of each network element of the plurality of network elements to a cluster of the second plurality of clusters;

wherein a constraint of an objective function of the optimization algorithm states that a total number of network elements assigned to a cluster is between a floor value of n/k and a ceiling value of n/k, where n is a total number of network elements within the network and k is the number of clusters to be generate; and routing, by the one or more processors, one or more data packets received from the plurality of network elements according to the generated matrix.

2. The method of claim 1, wherein executing the optimization algorithm comprises:

determining, for each network element, a product of the distance between the network element assigned to a cluster and the centroid of the cluster and each element in the generated matrix, where each element of the generated matrix identifies an assignment of a network element to a cluster;

summing each of the products in a first direction of the matrix; and summing the summed products in a second direction of the matrix.

3. The method of claim 2, summing each of the products in the first direction comprising summing products in each row of the matrix, each row corresponding to a network element, and summing the summed products in a second direction of the matrix comprising summing each column of the matrix, each column corresponding to a generated cluster of the network.

4. The method of claim 2, wherein determining the distance between each network element assigned to a cluster and the centroid of the cluster comprises computing an average of geo-coordinates of all network elements assigned to the cluster.

5. The method of claim 4, wherein the distance is a Euclidian distance.

6. The method of claim 1, wherein a first constraint of the objective function of the optimization algorithm states that each network element is assigned to one cluster.

7. The method of claim 6, wherein the first constraint is defined as the sum of all elements in each row of the matrix to be generated being equal to one.

8. The method of claim 7, wherein the second constraint is defined as the sum of all elements in each column of the matrix to be generated being between the floor value of n/k and the ceiling value of n/k.

9. The method of claim 1, wherein assigning each network element of the plurality of network elements to a cluster comprises assigning, by the one or more processors, each network element of the plurality of network elements to a cluster using a K-means clustering method.

10. A system comprising:

one or more non-transitory computer-readable media storing instruction thereon that, when executed by one or more processors, cause the one or more processors to perform operations comprising:

identifying a plurality of network elements, each network element configured to send and receive a plurality of data packets across a communications network;

assigning each network element of the plurality of network elements to a cluster of a first plurality of clusters according to a location of each network element;

determining a distance between each network element assigned to a cluster and a centroid of the cluster, wherein the centroid of the cluster is computed based on geo-coordinates of network elements assigned to the cluster;

executing an optimization algorithm using the distances to reassign the plurality of network elements to clusters of a second plurality of clusters that reduces a cost value of the optimization algorithm;

generating a matrix indicating an assignment of each network element of the plurality of network elements to a cluster of the second plurality of clusters;

wherein a constraint of an objective function of the optimization algorithm states that a total number of network elements assigned to a cluster is between a floor value of n/k and a ceiling value of n/k, where n is a total number of network elements within the network and k is the number of clusters to be generated; and routing one or more data packets received from the plurality of network elements according to the generated matrix.

11. The system of claim 10, wherein executing the optimization algorithm comprises:

determining, for each network element, a product of the distance between the network element assigned to a cluster and the centroid of the cluster and each element in the generated matrix, where each element of the generated matrix identifies an assignment of a network element to a cluster;

summing each of the products in a first direction of the matrix; and summing the summed products in a second direction of the matrix.

12. The system of claim 11, wherein summing each of the products in the first direction comprises summing products in each row of the matrix, each row corresponding to a network element, and wherein summing the summed products in a second direction of the matrix comprises summing each column of the matrix, each column corresponding to a generated cluster of the network.

13. The system of claim 11, wherein determining the distance between each network element assigned to a cluster and the centroid of the cluster comprises computing an average of geo-coordinates of all network elements assigned to the cluster.

14. The system of claim 10, wherein a first constraint of the objective function of the optimization algorithm states that each network element is assigned to one cluster.

15. The system of claim 10, wherein assigning each network element of the plurality of network elements to a cluster comprises assigning, by the one or more processors, each network element of the plurality of network elements to a cluster using a K-means clustering method.

16. One or more non-transitory computer-readable storage media storing instructions thereon that, when executed by one or more processors, cause the one or more processors to:

identify a plurality of network elements, each network element configured to send and receive a plurality of data packets across a communications network;

assign each network element of the plurality of network elements to a cluster of a first plurality of clusters according to a location of each network element;

determine a distance between each network element assigned to a cluster and a centroid of the cluster, wherein the centroid of the cluster is computed based on geo-coordinates of network elements assigned to the cluster;

execute an optimization algorithm using the distances to reassign the plurality of network elements to clusters of a second plurality of clusters that reduces a cost value of the optimization algorithm;

generate a matrix indicating an assignment of each network element of the plurality of network elements to a cluster of the second plurality of clusters;

wherein a constraint of an objective function of the optimization algorithm states that a total number of network elements assigned to a cluster is between a floor value of n/k and a ceiling value of n/k, where n is a total number of network elements within the network and k is the number of clusters to be generated; and route one or more data packets received from the plurality of network elements according to the generated matrix.

17. The one or more non-transitory computer-readable storage of claim 16, wherein executing the optimization algorithm comprises:

determining, for each network element, a product of the distance between the network element assigned to a cluster and the centroid of the cluster and each element in the generated matrix, where each element of the generated matrix identifies an assignment of a network element to a cluster;

summing each of the products in a first direction of the matrix; and summing the summed products in a second direction of the matrix.

18. The system of claim 17, wherein a first constraint of the objective function of the optimization algorithm states that each network element is assigned to one cluster.

* * * * *